Aug. 15, 1961     H. C. HANSEN     2,996,195
PORTABLE DERRICK
Filed May 16, 1958     2 Sheets-Sheet 1
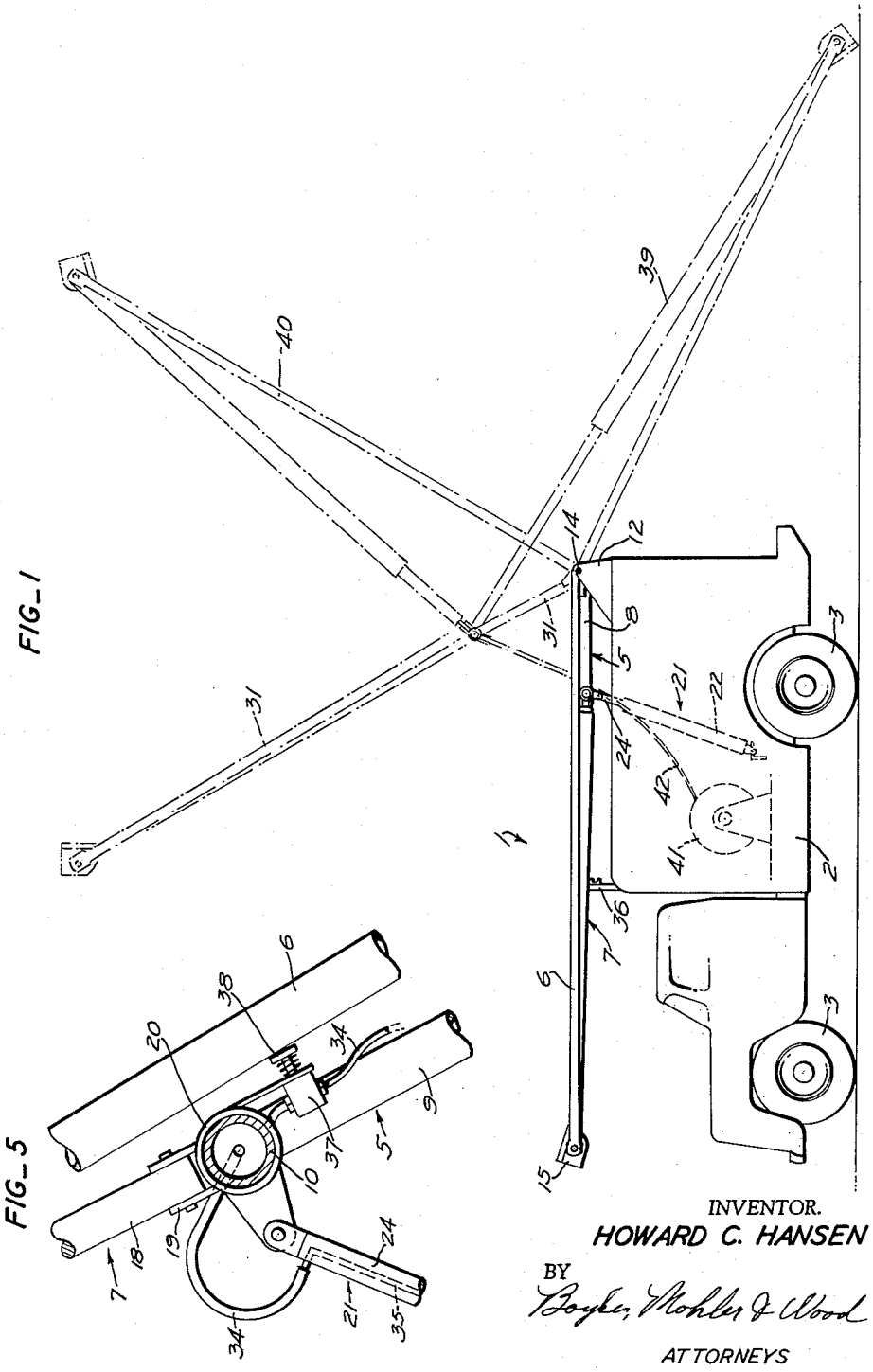
INVENTOR.
HOWARD C. HANSEN
BY
Boyken, Mohler & Wood
ATTORNEYS Aug. 15, 1961  H. C. HANSEN  2,996,195
PORTABLE DERRICK
Filed May 16, 1958  2 Sheets-Sheet 2
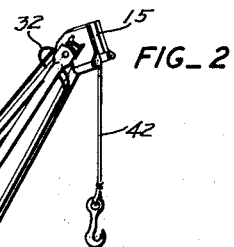
FIG_2
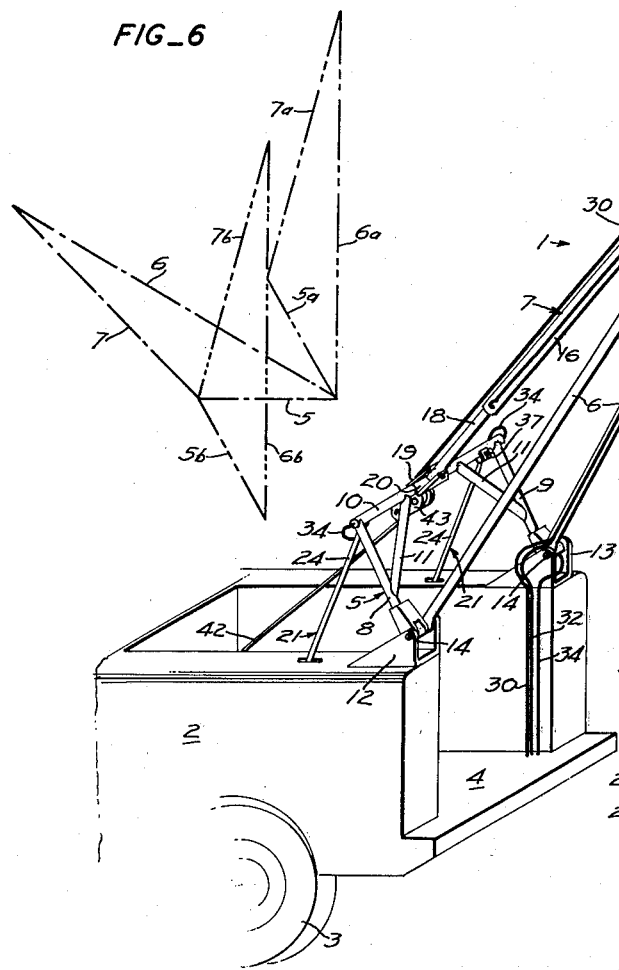
FIG_6
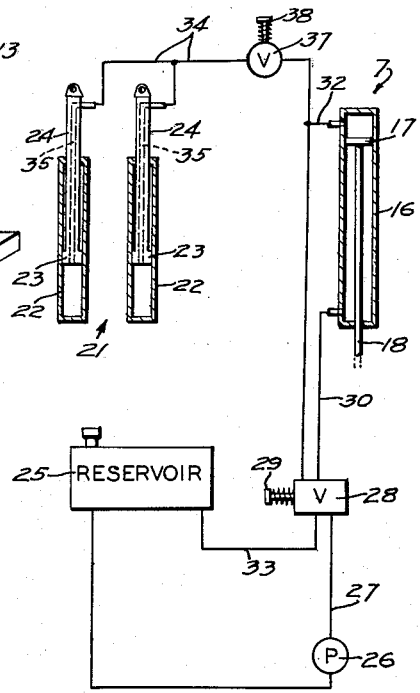
FIG_4
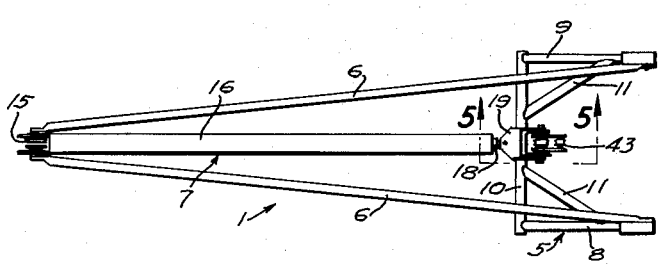
FIG_3
INVENTOR.
HOWARD C. HANSEN
BY
Boyken, Mohler & Wood
ATTORNEYS United States Patent Office 2,996,195
Patented Aug. 15, 1961

2,996,195
PORTABLE DERRICK
Howard C. Hansen, Piedmont, Calif., assignor to Utility Body Company, Oakland, Calif., a corporation of California
Filed May 16, 1958, Ser. No. 735,880
9 Claims. (Cl. 212—8)

This invention relates to derricks and more particularly to vehicle mounted derricks for use with utility body trucks and the like.

Maintenance vehicles used to service utility companies and the like have heretofore been provided with various types of derricks for performing a multitude of lifting tasks on the job. Most such utility trucks are provided with a powered winch and other powered equipment which is intended to be used in cooperation with the derrick mounted on the vehicle.

Since this type of vehicle is used for considerable street and highway travel it is preferable that the derrick be capable of being moved to a stored or transport position when not actively in use. The most feasible transport position is with the derrick boom extending over the top of the vehicle in a generally horizontal attitude. For service, the derrick boom must, of course, extend outwardly from the vehicle body and in many cases should provide for lowering the head sheave, at the end of the boom, to or near ground level.

To accomplish this purpose it is therefore necessary that the derrick boom be capable of swinging through an arc of substantially greater than 180° from the generally horizontal stored position to an extreme operating position extending angularly downwardly from the vehicle toward the ground. Since a simple conventional A-frame or derrick can be power driven through only something less than 180°, various complex devices have been proposed for providing the desired full range of movement. However, known prior art devices have encountered severe difficulties in providing this movement in that the structure employed was unduly complicated and costly or subject to failure due to overloading.

It is therefore a main object of this invention to provide a portable derrick which is capable of swinging through an arc of substantially greater than 180° while maintaining sufficient strength and rigidity to be capable of handling substantial loads.

Another object of this invention is the provision of novel structure in a vehicle mounted derrick movable from a stored position extending generally horizontally over the top of said vehicle to an extreme operating position extending angularly downwardly from said vehicle to the ground.

It is still another object of this invention to provide a portable derrick which may be simply and easily power driven through a full range of swinging movement substantially in excess of 180°.

A further object of this invention is the provision of an economically constructed portable derrick which is rugged and efficiently operative through a wide range of angularity with respect to the vehicle on which it is adapted to be mounted.

It is still a further object of this invention to provide an hydraulically driven derrick which may be easily controlled by one man and is both safe and substantially foolproof in operation.

Other objects and advantages will become apparent from the following description taken in connection with the accompanying drawings, in which:

FIG. 1 is a side elevational view of the derrick of this invention mounted on a vehicle, and showing the range through which the derrick may be operated;

FIG. 2 is a perspective view of the rear end of the vehicle of FIG. 1 showing the derrick of this invention in an operating position;

FIG. 3 is a top plan view of the derrick of FIG. 1 in a stored or transport position;

FIG. 4 is a semi-schematic view of an hydraulic control system for this invention;

FIG. 5 is a greatly enlarged sectional view as seen from line 5—5 of FIG. 3, but with the portions of the derrick in a slightly different position; and, FIG. 6 is a diagrammatic view showing the basic parts and functions of the derrick of this invention.

In detail, the derrick of this invention, generally designated 1 (FIGS. 1, 2), is adapted to be mounted on a vehicle body 2 having ground wheels 3. Vehicle 2 may be of the utility service type adapted to carry both maintenance men and equipment to job sites for installation and repair of utility poles and various other equipment.

The derrick 1 mounted on vehicle 2 adds substantially to the utility of such vehicle by performing such useful tasks as loading and unloading the vehicle bed 4 (FIG. 2), lifting and moving various loads, and supporting various tools and the like during their operation. Since vehicles of the type herein referred to are intended to travel under a wide variety of circumstances both on and off conventional roads and highways, derrick 1 is preferably mounted on the upper portion of the vehicle body 2 and is capable of assuming a stored position during travel of the vehicle as shown in solid lines in FIG. 1.

In general, derrick 1 includes a base member 5, one or more rigid, elongated legs comprising a boom 6, and a third extendable leg or cylinder means 7. The base member 5 (FIGS. 2, 3) is a generally U-shaped frame formed from tubular members or pipes welded together and including a pair of side members 8, 9 and a transverse member 10 connecting one of the corresponding ends of said side members. Braces 11 may extend between the side members and member 10 for strengthening and providing rigidity to base member 5.

Base member 5 is adapted to be mounted on the upper portion of vehicle body 2 for tilting movement between a generally horizontal position (FIG. 1) to an upright or second position inclined to the horizontal (FIG. 2). Means for so mounting said base member are provided by a pair of brackets 12, 13 supported at spaced points on the upper rear end of vehicle body 2 and having axially aligned pivots 14 (FIG. 2) which extend through the ends of members 8 and 9 remote from member 10. In this manner, base member 5 is supported for swinging movement in a generally vertical arc about the horizontal axis of pivots 14, which axis extends generally transversely of the vehicle body 2.

Boom 6 and extendable leg 7 are pivotally connected to base member 5 for swinging about a pair of spaced, parallel axes. The boom preferably comprises a pair of diverging, rigid legs 6 the divergent ends of which may be connected to the brackets 12, 13 by pivots 14 so as to mount the boom for swinging about the same axis as base member 5. The opposite, converging ends of boom legs 6 may be pivotally connected to a head sheave 15, and they are thereby swingable as a unit through a generally vertical arc about the axis of pivots 14.

Extendable leg 7 is pivotally connected at one end to said opposite ends of boom legs 6 by rigidly connecting it to the pivotally mounted head sheave 15 and at its opposite end to transverse member 10 of base 5 to provide means for so swinging boom 6. Preferably, leg 7 is in the form of hydraulic cylinder means comprising a double acting hydraulic cylinder 16 having an internal piston 17 (FIG. 4) from which a piston rod 18 extends outwardly of one end of cylinder 16. It will be noted in FIGS. 2 and 3 that the projecting end of rod 18 is swingably connected to transverse member 10 whereas the opposite end of cylinder 16 is pivotally connected to head sheave 15 at the upper end of boom 6.

The swingable connection between piston rod 18 and transverse member 10 may be provided by a bracket 19 connected to said piston rod and which is secured to a sleeve 20 (FIGS. 2, 5) which is journalled on member 10. It is obvious that the other end of cylinder 16 may be connected to boom 6 at any point spaced outwardly from pivots 14 depending upon the mechanical advantage desired to be applied by the extendable leg 7 in swinging boom 6.

Power means, generally designated 21 (FIGS. 1, 2), are provided for tilting or swinging base member 5 from its generally horizontal first position of FIG. 1 to the second, intermediate or inclined position of FIG. 2. Power means 21 are preferably hydraulic cylinder means, comprising a pair of single acting hydraulic cylinders 22 (FIG. 4) having pistons 23 with rods 24 projecting therefrom. The outer projecting ends of rods 24 are pivotally connected to the opposite ends of transverse member 10 of base 5 (FIG. 5) and the opposite ends of cylinders 22 may be pivotally secured to vehicle body 2 (FIG. 1). It will be noted in FIG. 2 that mounting base member 5 and hydraulic cylinder means 21 in the manner described leaves the vehicle bed 4 comparatively free of any supporting structure so that it may be used for transporting materials and the like.

The control system for hydraulic cylinder means 7 and 21 includes, semi-diagramatically, an hydraulic reservoir 25 (FIG. 4), a pump 26, and various conduit means for transferring fluid under pressure to cylinder means 7, 21. Said pump is in the pressure line 27 connected from reservoir 25 to a conventional slide valve 28. Valve 28 is of the type having an inoperative position, in which it recirculates the hydraulic fluid to the reservoir 25, and two, opposed operative positions. Reservoir 25, pump 26 and valve 28 may be mounted in any suitable location on vehicle 2 and said valve is provided with a control handle 29 spring urged to the inoperative position.

In a first operating position valve 28 channels the hydraulic fluid from pressure line 27 through a conduit means or line 30 to the lower end of cylinder 16 (FIG. 4) which is adjacent base member 5 (FIG. 2). A return line 32 of the conduit means (FIGS. 2, 4) carries the hydraulic fluid from the upper or piston end of cylinder 16 through valve 28, in its aforementioned first operating position, and line 33 (FIG. 4) to reservoir 25.

When piston 17 is at the upper end of cylinder 16 the effective length of extendable leg 7 between its ends is reduced to a minimum. With extendable leg 7 at such minimum length boom 6 will extend in generally parallel overlying relation to said extendable leg and to base member 5, as seen in the solid line position and dot-dash line position 31 of FIG. 1. In this non-operating position of boom 6 it will be seen that the length thereof between pivots 14 and the point of connection of leg 7 is substantially equal to the combined minimum length of said leg plus the distance between the axis of pivots 14 and the pivotal connection 19, 20 between leg 7 and base member 5.

Upon manual operation of control handle 29 to the opposed, second operating position the hydraulic fluid under pressure from line 27 is channeled by valve 28 to line 32 and branch lines 34 which communicates with cylinders 22. As indicated in FIG. 4, in order to conserve the length of the hydraulic fluid lines line 34 may communicate with cylinders 22 on the pressure side of pistons 23 through passageways 35 in piston rods 24. It will also be noted in FIG. 5 that one of branch lines 34 may extend through transverse member 10 providing equal communication for the hydraulic fluid to both cylinders 22.

With the control handle in the second, operating position described the hydraulic fluid under pressure in lines 32 and 34 will move pistons 17 and 23 thereby extending rods 18 and 24 outwardly of their respective cylinders. The line 30 from the opposite end of cylinder 16 thereby becomes a return line for carrying the displaced fluid from cylinder 16 through valve 28 and line 33 to reservoir 25.

In their shortest or collapsed condition, i.e., without fluid pressure directed to them, hydraulic cylinder means 21 serve to support base member 5 in a generally horizontally extending, stored or transport position generally overlying vehicle body 2 (FIG. 1). As previously described, with extendable leg 7 in a similarly collapsed condition boom 6 extends in a generally parallel overlying relationship to base member 5. Thus, the entire derrick structure, including base member 5, boom 6, and extendable leg 7, extends forwardly from brackets 12, 13 in overlying relationship to vehicle body 2 in a stored position (FIG. 1). A rest member 36 may be provided at the forward end of body 2 for supporting derrick 1 in this stored position for transport. It will be noted that derrick 1 is thereby conveniently stored in a position in which it adds negligibly to the height of vehicle 2 and is for all practical purposes out of the way of interference with vehicle travel.

When it is desired to swing boom 6 to an operative position control handle 29 of valve 28 is manipulated as previously described to its second operating position to channel the hydraulic fluid under pressure through lines 32 and 34. It will be noted that in the stored position the angle between extendable leg 7 and boom 6 is relatively small and therefore the hydraulic pressure necessary to extend leg 7 by urging piston 17 and rod 18 outwardly of cylinder 16 is substantially greater than the pressure required to project piston rods 24 outwardly of cyilnders 22, whose angle of attack relative to member 5 is much greater. The fact that the pair of cylinder means 21 preferably present a greater area to the hydraulic fluid under pressure than cylinder means 7 also assists in providing less resistance to extension of the latter. For this reason cylinder means 7 and boom 6 will remain in an inoperative position as cylinder means 21 first lifts the forward end of base member 5 including the pivotal connection 19, 20.

When cylinder means 21 reach full extension, i.e., when pistons 23 reach the outer end of their stroke, base member 5 is tilted approximately 60° from its stored position to the second position indicated by dot-dash line 31 in FIG. 1. Since boom 6 is resting on base member 5 the former will be swung with the latter through this 60° vertical arc.

In the position 31 the hydraulic fluid pressure is built up, by pump 26, in lines 32, 34 sufficiently to overcome the resistance of cylinder means 7 and to move piston 17, thereby projecting rod 18. The resulting extension of leg or cylinder means 7 causes swinging of boom 6 away from base member 5 through a further vertical arc.

In order to prevent accidental collapse of cylinder means 21 a spring loaded valve 37 (FIGS. 2, 4, 5) is interposed in line 34. Valve 37 is held in an open position, permitting flow of hydraulic fluid through line 34, by means of a leg of boom 6 engaging the control lever 38 of valve 37 when said boom is in its non-operating position in overlying engagement with base member 5 (FIG. 5). As boom 6 is swung away from base member 5 by the extension of leg 7 said boom disengages lever 38 thereby permitting the spring return of said lever to a position closing valve 37. By this means, when boom 6 is in any operating position removed from base member 5, valve 37 closes line 34 against the flow of hydraulic fluid from cylinders 22 thereby assuring that piston rods 24 remain in their projected positions.

As leg 7 is further extended it causes boom 6 to swing through a generally vertical arc from base member 5 to an extreme operating position shown by dot-dash line 39 (FIG. 1), approximately 220° removed from the stored position, with head sheave 15 in engagement with the ground surface on which the vehicle is supported. Further extension of leg 7 from this position will enable lifting of the rear ground wheels 3 of the vehicle off the ground, if the cylinder 16 and piston 17 combination is sufficiently strong and supplied with sufficient hydraulic pressure from pump 26.

A more usual operating position is indicated by the dot-dash line 40 in FIG. 1, in which position the boom 6 may be used in conjunction with a hoisting drum 41 and cable 42 conventionally carried by vehicles of the type herein described. In addition to head sheave 15 it will be noted, in FIGS. 2, 3, that the derrick of this invention is preferably provided with an idler sheave 43 freely swingably mounted on transverse member 10 of base 5. The hoist cable 42 extends from drum 41 between the pulleys on idler sheave 43 and over head sheave 15 to perform various lifting tasks in conjunction with derrick 1 in an operative position 40. The range of movement of boom 6 is such that loads can be lifted by cable 42 with boom 6 in the position 40 and then loaded into the bed 4 of the vehicle by swinging boom 6 to a generally vertically extending position with head sheave 15 directly over said bed.

FIG. 6 illustrates diagrammatically the tilting of base member 5 which brings about the substantial increase in the range of swinging of boom 6 from the stored position to the extreme operating position. It is noted that member 5, boom 6 and extendable leg 7 form a force triangle whereby, as previously described, the extension and contraction of leg 7 causes said leg and boom 6 to swing together through a generally vertical arc. It will be obvious that this movement alone is necessarily restricted to slightly less than an arc of 180° since the angular relationship between boom 6 and leg 7 must exist for leg 7 to apply the force to swing boom 6.

By tilting the base 5 of the triangle to a position 5a the total range of movement of boom 6 is increased by the amount of such tilt since the entire triangle is thereby tilted to a position 6a, 7a. It will be understood that this result may also be accomplished by tilting base member 5 to a position 5b in which boom 6b and leg 7b occupy a parallel position to boom 6a and leg 7a.

The triangular condition illustrated by numerals 5, 6 and 7 in FIG. 6 is not found in actual practice, but is illustrative only of the relative positions of the boom as base member 5 is tilted. What is accomplished, in effect, is to oppositely vertically displace the pivot points of boom 6 and leg 7 so that the range of movement of the boom is increased. This may also be accomplished by first lifting the pivotal connection 19, 20 (FIG. 2) from the vehicle before swinging boom 6 by cylinder means 7. The illustration of 5b, 6b, and 7b in which the pivotal connection of boom 6 is lowered may provide favorable conditions for mounting on the front of a vehicle in reversed position to that shown in FIG. 1.

It will be obvious that power means other than cylinders 22 and 16 may be employed to tilt base member 5 and to swing boom 6, respectively, if desired. The hydraulic cylinder means herein disclosed are deemed preferable from the standpoint of ease of control and structural simplicity with strength.

Although the envention has been described and illustrated in detail it is not intended that it should be limited thereby but only by the spirit and scope of the appended claims.

I claim:

1. In combination with a truck body, a portable derrick comprising: a base member, a rigid boom, said member and said boom being pivotally connected together at their corresponding ends to said body for swinging in a generally vertical arc about a first axis, and extendable leg pivotally connected at one end to said member for swinging in a generally vertical arc about a second axis parallel to and spaced from said first axis, means pivotally connecting the other end of said leg to said boom at a point spaced from said end of said boom, first reversible power means for extending and contracting the length of said leg between its ends for so swinging said boom from a nonoperating position overlying and adjacent said second axis to an extreme operating position substantially 180° removed from said nonoperating position and vice versa, means supporting said base member for tilting movement causing opposed, relative vertical displacement of said axes, and second power means for so tilting said member.

2. In combination with a truck body, a portable derrick comprising: a base member, a rigid boom, said member and said boom being pivotally connected together at their corresponding ends to said body for swinging in a generally vertical arc about a first axis, an extendable leg pivotally connected at one end to said member for swinging in a generally vertical arc about a second axis parallel to and spaced from said first axis, means pivotally connecting the other end of said leg to said boom at a point spaced from said one end of said boom, first reversible power means for extending and contracting the length of said leg between its ends for so swinging said boom from a nonoperating position overlying and adjacent said second axis to an extreme operating position substantially 180° removed from said nonoperating position and vice versa, means supporting said base member for tilting movement causing opposed, relative vertical displacement of said axes, and second power means for so tilting said member, said second and said first power means being operable in a predetermined sequence whereby said member is so moved from a stored position with said axes lying in a generally horizontal plane before said leg is so extended.

3. In combination with a truck body, a portable derrick comprising: a base member, a rigid boom, said member and said boom being pivotally connected together at their corresponding ends to said body for swinging in a generally vertical arc about a first axis, an extendable leg pivotally connected at one end to said member for swinging in a generally vertical arc about a second axis parallel to and spaced from said first axis, means pivotally connecting the other end of said leg to said boom at a point spaced from said one end of said boom, first reversible power means for extending and contracting the length of said leg between its ends for so swinging said boom from a nonoperating position overlying and adjacent said second axis to an extreme operating position substantially 180° removed from said nonoperating position and vice versa, means supporting said base member for tilting movement causing opposed, relative vertical displacement of said axes, second power means for so tilting said member, and means locking said member from said tilting movement when said boom is in other than said nonoperating position.

4. In combination with a truck body, a portable derrick comprising: a base member, a rigid boom, said boom member and said boom being pivotally connected together at their corresponding ends to said body for swinging in a generally vertical arc about a first axis, an extendable leg pivotally connected at one end to said member for swinging in a generally vertical arc about a second axis parallel to and spaced from said first axis, means pivotally connecting the other end of said leg to said boom at a point spaced from said one end of said boom, first reversible power means for extending and contracting the length of said leg between its ends for so swinging said boom from a nonoperating position overlying and adjacent said second axis to an extreme operating position substantially 180° removed from said nonoperating position and vice versa, means supporting said base member for tilting movement causing opposed, relative vertical displacement of said axes, and second power means for so tilting said member, said power means including hydraulic cylinder means, 5. A derrick adapted to be mounted on a vehicle, comprising: a base member, a boom, a pivotal connection for mounting said base member and said boom on said vehicle for swinging movement about a generally horizontal axis extending transversely of said vehicle, first hydraulic cylinder means extending between and respectively pivotally connected to said member and said boom at points spaced from said pivotal connection for so swinging said boom with respect to said member, second hydraulic cylinder means extending between and respectively connected to said vehicle and said member at points spaced from said pivotal connection for so swinging said member with respect to said vehicle, said boom being in overlying relationship with said member in a generally horizontal stored position extending over the top of said vehicle, whereby said second cylinder means swings said member and said boom upwardly together to an intermediate position extending angularly upwardly from said vehicle and said first cylinder means further swings said boom to an extreme operating position removed from said stored position by an angle substantially greater than 180 degrees, each of said cylinder means including an hydraulic cylinder and piston, a source of hydraulic fluid under pressure, conduit means connecting said cylinders with said source, and a valve in the conduit means connected to said second cylinder, spring means urging said valve to a closed position, and means engageable by said boom in said overlying relationship for holding said valve open, whereby hydraulic fluid is trapped in said second cylinder by said valve to prevent movement of said second cylinder and piston when said boom is in other than said overlying relationship.

6. A portable derrick for use on a truck body comprising: a base member pivotally mounted at one end to said body, power means connected to said member for swinging the same from a substantially horizontal position to a position with its other end elevated from said body, an elongated extensible leg pivotally connected at one end to said other end of said base for swinging in a vertical plane relative thereto and provided at its other end with a load carrying head, a boom pivotally connected at one end to said body and to said one end of said base member and pivotally connected at its other end to said leg adjacent said head whereby said boom swings with said leg as the latter is extended and contracted, hydraulic power means for so extending and contracting said leg.

7. A portable derrick for use on a truck body comprising: a base member pivotally mounted at one end to said body, power means connected to said member for swinging the same from a substantially horizontal position to a position with its other end elevated from said body, an elongated extensible leg pivotally connected at one end to said other end of said base for swinging in a vertical plane relative thereto and provided at its other end with a load carrying head, a boom pivotally connected at one end to said body and to said one end of said base member and pivotally connected at its other end to said leg adjacent said head whereby said boom swings with said leg as the latter is extended and contracted, hydraulic power means for so extending and contracting said leg, said means for swinging said member and said means for extending and contracting said leg being operable in a predetermined sequence whereby said member is moved from a generally horizontal stored position before said leg is extended.

8. In combination with a vehicle having a body, a portable derrick comprising: a base member pivotally mounted at one end to said body for swinging about a horizontal axis, power means for swinging said base member from a substantially horizontal position about said axis to an elevated position in which the opposite end of said base member is spaced upwardly from said axis, a boom swingably supported at its inner end on said body for swinging in a vertical arc relative to said body, an elongated extensible leg swingably connected at its inner end to the outer end of said base member for swinging in a vertical arc relative to said body, means pivotally connecting said leg and boom together at a point spaced a substantial distance from said base member to provide a substantially triangular structure defined by said base member, boom and leg, and whereby said structure may be swung as a unit in a vertical arc when said base is swung about said axis, power means for extending and contracting the length of said leg between said base member and the point at which it is connected with said boom for swinging said boom relative to said base member, the length of said leg between the point at which it is swingably connected at its inner end to said base and the point at which it is pivotally connected to said boom being sufficiently short in its fully contracted condition to permit said leg to be swung to a position in which it is in substantial alignment with said base and directed away from said body, whereby said boom may be swung from a generally horizontal position with said base substantially horizontal through an arc in excess of 180° to a position with the outer end of said boom substantially below said axis and with said base in said elevated position.

9. In combination with a vehicle having a body, a portable derrick comprising: a base member pivotally mounted at one end to said body for swinging about a horizontal axis, power means for swinging said base member from a substantially horizontal position about said axis to an elevated position in which the opposite end of said base member is spaced upwardly from said axis, a boom swingably supported at its inner end for swinging in a vertical arc relative to said body, an elongated extensible leg swingably connected at its inner end to the outer end of said base member for swinging in a vertical arc relative to said body, means pivotally connecting said leg and boom together at a point spaced a substantial distance from said base member to provide a substantially triangular structure defined by said base member, boom and leg, and whereby said structure may be swung as a unit in a vertical arc when said base is swung about said axis, power means for extending and contracting the length of said leg between said base member and the point at which it is connected with said boom for swinging said boom relative to said base member, said leg being of sufficient length and extensibility to permit said boom to be swung from a generally horizontal position with said base member substantially horizontal through an arc in excess of 180° to a position with the outer end of said boom substantially below said axis and with said base in said elevated position, the shortest length of said leg during said swinging of said boom being no greater than the difference between the distance from the point at which the inner end of said boom is swingably supported and the point on said boom to which said leg is connected and the distance between said point at which the inner end of said boom is swingably supported and the outer end of said base at which said leg is supported to thereby permit said swinging of said boom in excess of said 180° relative to said body.

References Cited in the file of this patent
UNITED STATES PATENTS

| | | |
|---|---|---|
| 905,208 | Mitchell | Dec. 1, 1908 |
| 2,340,351 | Thornburg | Feb. 1, 1944 |
| 2,450,152 | Miller | Sept. 28, 1948 |
| 2,782,939 | Bernaerts | Feb. 26, 1957 |
| 2,830,711 | Bill | Apr. 15, 1958 |